United States Patent
Zimniewicz

(10) Patent No.: US 6,910,208 B1
(45) Date of Patent: Jun. 21, 2005

(54) SYSTEM AND METHOD OF PROVIDING REPLACEABLE AND EXTENSIBLE USER INTERFACE FOR THE INSTALLATION OF A SUITE OF APPLICATIONS

(75) Inventor: Jeff A. Zimniewicz, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/557,143

(22) Filed: Apr. 25, 2000

(51) Int. Cl.[7] .............................................. G06F 9/445

(52) U.S. Cl. ........................ 717/174; 717/111; 715/762

(58) Field of Search ......................... 717/111, 174–178, 717/168, 170; 345/762, 763, 760, 767

(56) References Cited

U.S. PATENT DOCUMENTS

| | | | | |
|---|---|---|---|---|
| 5,335,320 A | * | 8/1994 | Iwata et al. .................. | 717/110 |
| 5,347,629 A | * | 9/1994 | Barrett et al. ................ | 345/762 |
| 5,530,961 A | * | 6/1996 | Janay et al. ................. | 345/744 |
| 5,603,034 A | * | 2/1997 | Swanson ..................... | 717/111 |
| 5,675,752 A | * | 10/1997 | Scott et al. .................. | 345/866 |
| 5,712,993 A | * | 1/1998 | Ichikawa ..................... | 345/762 |
| 5,760,788 A | * | 6/1998 | Chainini et al. ............. | 345/474 |
| 5,764,226 A | * | 6/1998 | Consolatti et al. ........... | 345/747 |

(Continued)

FOREIGN PATENT DOCUMENTS

| | | | | |
|---|---|---|---|---|
| GB | WO 98/41934 | * | 9/1998 | ........... G06F/17/30 |

OTHER PUBLICATIONS

Cardelli, Luca, Digital Equipment Corporation, "Building User Interfaces by Direct Manipulation", 1988 ACM, retrieved from ACM Portal, Oct. 18, 2002.*

Hogue, Stephane, Speedware Corporation Inc., "The Wizard of UI–The Technical Writer and User Interface Reviews", 1997, IEEE, retrieved from IEEE, Oct. 18, 2002.*

Myers, Brad A., & Buxton, William, Dynamic Graphics Project, Univ. of Toronto, "Creating Highly–Interactive and Graphical Use Interfaces by Demonstration", 1986, ACM, retrieved from ACM Portal, Oct. 18, 2002.*

"Installshield: InstallShield software unveils its powerful installation environment for Windows 2000", M2 Presswire; Coventry; ju 4,1999, retrieved from ProQuest database, Oct. 18, 2002.*

Plumley, "Documented Backoffice", John Wiley & Sons, Inc. 1998.

*Smart Update Developer's Guide,* "Chapter 4 Writing an Installation Script", available at http://developer.netscape-.com/docs/manuals/communicator/jarman/install.htm, accessed Jan. 15, 2001.

Primary Examiner—Antony Nguyen-Ba
Assistant Examiner—Mary J Steelman
(74) Attorney, Agent, or Firm—Leydig, Voit & Mayer, Ltd.

(57) ABSTRACT

Presented is a system and a method for installing a suite of application programs that uses a common structure of a wizard page returned from a procedure exported from a dynamic link library (DLL) or executable (EXE) file. In this way, component writers are able to write their UI in a separate DLL or executable (EXE) file for their component. This improves portability of the UI as the writers are now able to take this file and copy it from version to version without needing to rewrite or port the code in any way. Further, the system and method allow for the usage of a number of default or template UI screens. Modification of the display order, including insertion and deletion of UI screens as well as reordering of the screens is also provided by the system and method of the invention. This functionality is provided through a textural setup database file that includes a textural listing of the UI screens to be utilized. A suite integration toolkit (SIT) utilizes this text file to coordinate the UI display.

15 Claims, 8 Drawing Sheets

U.S. PATENT DOCUMENTS

| | | | |
|---|---|---|---|
| 5,859,637 A | * | 1/1999 | Tidwell, II ................... 345/708 |
| 5,862,395 A | * | 1/1999 | Bier .............................. 712/1 |
| 5,950,010 A | | 9/1999 | Hesse et al. |
| 5,960,204 A | | 9/1999 | Yinger et al. |
| 5,966,540 A | | 10/1999 | Lister et al. |
| 6,006,035 A | * | 12/1999 | Nabahi ....................... 717/175 |
| 6,035,300 A | * | 3/2000 | Cason et al. ................. 707/102 |
| 6,046,741 A | * | 4/2000 | Hochmuth ................... 345/704 |
| 6,066,182 A | * | 5/2000 | Wilde et al. ................. 717/175 |
| 6,134,593 A | | 10/2000 | Alexander et al. |
| 6,157,364 A | * | 12/2000 | Kohler ....................... 345/855 |
| 6,259,447 B1 | * | 7/2001 | Kanetake et al. ........... 345/764 |
| 6,266,811 B1 | * | 7/2001 | Nabahi ....................... 717/174 |
| 6,279,154 B1 | | 8/2001 | Davis |
| 6,282,699 B1 | * | 8/2001 | Zhang et al. ................ 717/109 |
| 6,282,711 B1 | * | 8/2001 | Halpern et al. .............. 717/175 |
| 6,314,415 B1 | * | 11/2001 | Mukherjee ................... 706/47 |
| 6,327,705 B1 | | 12/2001 | Larsson et al. |
| 6,360,365 B1 | * | 3/2002 | Curtis ........................ 717/169 |
| 6,407,758 B1 | * | 6/2002 | Usami et al. ................ 345/778 |
| 6,446,260 B1 | * | 9/2002 | Wilde et al. ................. 717/173 |
| 6,449,649 B1 | * | 9/2002 | Janay et al. ................. 709/227 |
| 6,460,040 B1 | * | 10/2002 | Burns .......................... 707/10 |
| 6,466,941 B1 | * | 10/2002 | Rowe et al. ................. 707/102 |
| 6,618,857 B1 | * | 9/2003 | Marino et al. .............. 717/175 |
| 6,621,505 B1 | * | 9/2003 | Beauchamp et al. ........ 345/764 |

* cited by examiner

SYSTEM AND METHOD OF PROVIDING REPLACEABLE AND EXTENSIBLE USER INTERFACE FOR THE INSTALLATION OF A SUITE OF APPLICATIONS

TECHNICAL

This invention relates generally to systems and methods for installing application program suites and, more particularly, relates to the customization, expansion, and replacement of user interface (UI) displays for the communication and collection of information necessary to accomplish the installation of a suite of application programs.

BACKGROUND OF THE INVENTION

With the continued growth and specialization of various software applications for both business and residential users, software original equipment manufacturers (OEMs) and secondary value added providers (VAPs) have begun selectively combining these applications into suites. The selection of the particular applications to include in a suite is made based on certain synergies desired to be achieved for a particular customer or group of customers. In this way a business customer, for example, may purchase a single suite that provides all of the applications to allow complete productivity for all of the functions that are normally performed in the business environment. This selection and grouping process by the OEMs and/or the VAPs greatly simplifies the decision process at the user level, and typically allows for a common user experience across applications since typically all applications will be from a particular OEM.

Another advantage provided by a suite of applications exists at the system administration level. Unlike the requirement of having to separately install and setup each individual application, entering the same user information over and over for each application, the installation of a suite is much more integrated. Most suites employ an installation wizard of some sort that installs and sets up all of the applications within the suite at one time. While this presents a distinct advantage over the individual application installation and setup, the structure of modern suites present problems for current installation processes.

A custom user interface (UI) is used in almost all current setup applications that are used in the market. The most common model for a setup UI at this time is the setup "wizard." A wizard is a sequence of pages that help a user complete a set of tasks by establishing the flow of the setup in a single-page sequence, accessible only by the "Back" and "Next" buttons. While the typical configuration of the wizard provides the basis for an installation, it does not meet the needs of every application that exists.

A typical sequence of pages for a wizard is to first display a Welcome Page, followed by a page displaying the End User License Agreement (EULA). Next, the wizard typically begins to collect information from the user by displaying a Name/Organization page. To enable the installation configuration, the wizard next typically displays a Selection of Install Type (Minimal/Typical/Custom or Client/Server) page to enable the user to decide what type of installation he or she desires. This selection process may be furthered by the display of a Selection of Install Components/Features screen. Depending on the particular components selected for install, the wizard may need to display a screen asking specific questions regarding the selection components. Once the required information has been gathered and the installation initiated, the wizard typically displays a Progress of Installation screen to keep the user apprised of the installation progress. Finally, the wizard displays a Finish screen once the installation process has been completed.

Some setup applications allow a setup owner to modify templatized pages, while others allow outright replacing of some specific pages. However, the component selection and specific component related pages are hard to override due to the complex nature of how these concepts are handled in other setup technologies. Further, other setup applications require several steps to setup the UI within an application, and in some cases require copying all of the UI code from one suite into another. This results in poor portability of customized setup, and increases the time required and chance of error in the process. If the re-ordering of the pages were desired, prior systems required that a significant amount of code would either have to be changed or rewritten to work with the new ordering or pages. Also a lot of testing would be needed to make sure that no code was relying on another execution path being run before. Further, since the core execution was so tightly tied in with the UI, complete replacement of the UI would require a major code change and could not conceivably be done.

There, therefore, exists a need in the art to overcome these and other problems existing with the current state of suite installation programs.

SUMMARY OF THE INVENTION

The inventive concepts of the instant invention relate to setup and installation applications, and more particularly to setup "wizards" for application program suites. Specifically, the concepts disclosed herein extend the generic functionality of a wizard by allowing what used to be a static set of user interface (UI) pages to be modified and arranged at any given time in a very easy to understand way. The invention addresses various problems existing with current setup toolkits, and provides the functionality to completely rewrite the custom UI model (replace). The system of the invention also allows a user to extend the existing/sample UI model to meet specific needs, such as adding custom pages. Further, the invention allows a user to rearrange the existing/sample UI without modifying any code merely by editing or modifying a text file. Finally, the system of the invention allows a user to easily reuse existing pages from a different Suite Integration Toolkit (SIT) suite, and allows the portability of these pages for use with other wizards.

The system and method of the instant invention overcomes the above described and other problems existing in the art by using a common structure of a wizard page that is returned from a procedure exported from a dynamic link library (DLL) or executable (EXE) file. In this way, component writers are able to write their UI in a separate DLL or executable (EXE) file for their component. This improves portability of the UI as the writers are now able to take this file and copy it from version to version without needing to rewrite or port the code in any way. Also, the ability to abstract a piece of UI in the model that SIT uses allows that UI to be reused in any SIT suite by simply specifying file names when appropriate.

This system addresses the ability to change the order and/or replace the entire UI in two ways. With regard to the changing of the order of the UI, this order is dictated in plain the setup database (setup.sdb) file. In this way, the order may be changed by simply using a text editor to rearrange the order, add to or delete items from the list. specified therein. With regard to the wholesale replacement of the UI, the entire UI engine of the instant invention is preferably implemented as a component object model (COM) interface (ISetupUI). This interface includes a simple set of methods that can be implemented in any fashion/UI model.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
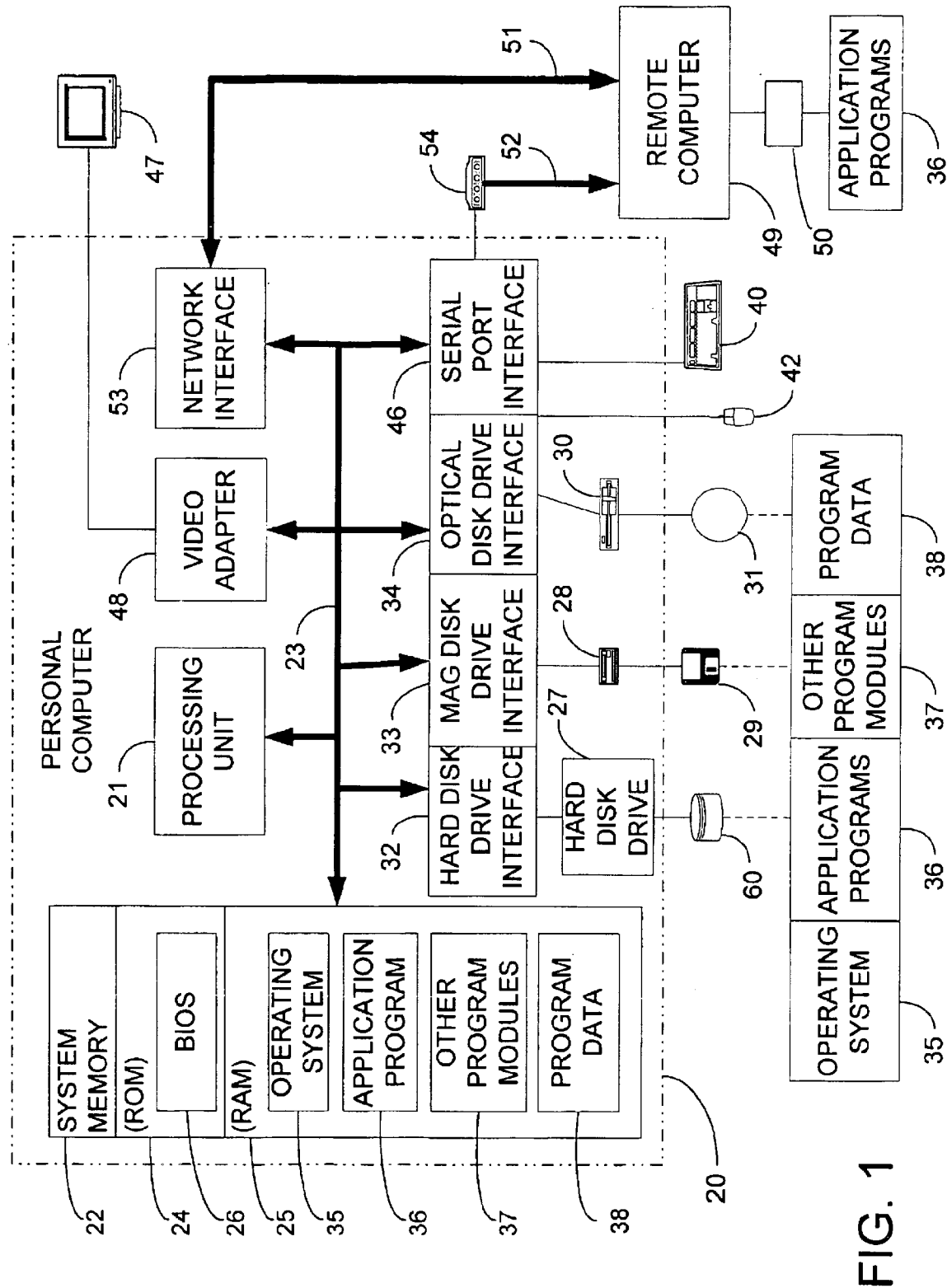
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk-drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a system and method are presented that allows an application write to overcome the above-described problems when writing a custom user interface (UI) or designing a setup program around a fixed UI model. The model of the customer UI presented by the instant invention is related to the general concept or standard of wizards. That is, the instant invention extends the generic functionality of a wizard by allowing the prior, static set of installation and setup pages to be modified and arranged at any given time in a very easy to understand way that provides flexibility, extensibility, and portability to the UI. As will be described more fully below, the system of the instant invention allows an application program writer to completely rewrite a custom UI model for the installation and setup of an application program suite. Further, the system and method of the instant invention allows the write the ability to extend the existing UI model to meet the specific needs of any particular suite or application therein. The ability to rearrange the existing UI without modifying any code is also provided through simple text file modification. Through the system of the instant invention, the writer is given the ability to easily reuse existing pages for different setup applications.

This system is embodied in a Suite Integration Toolkit (SIT) and utilizes a common architecture used for a setup database file (setup.sdb) to identify components having actions to be performed during each stage. SIT facilitates this functional parsing of the overall installation and setup of multiple applications in a suite by providing a generic solution to the problem of integrating multiple setups (e.g. a box containing OS, IE, Microsoft management console (MMC), server app, etc.) into a single, concise, unified setup. This setup has well defined phases during which different classes of actions may be performed. SIT complements, but does not replace, existing installer techngology. SIT works as an integration layer for disparate setups but does not perform core setup tasks such as file copy, registry operations, etc., although it may be expanded to do so if desired.

In addition to addressing existing user interface (UI) issues as discussed above, SIT also preferably provides a flexible and extensible COM layer for applications that want to hook into setup. This allows these applications to modify the UI as will be discussed in greater detail below, launch additional processes during the particular phases of setup, or install components that have previously been downloaded to a central directory on the local machine. While significant advantages are presented when SIT is COM based, one skilled in the art will recognize that SIT may be programmed using other technology without departing from the scope or spirit of the teachings herein.

Figure 2:
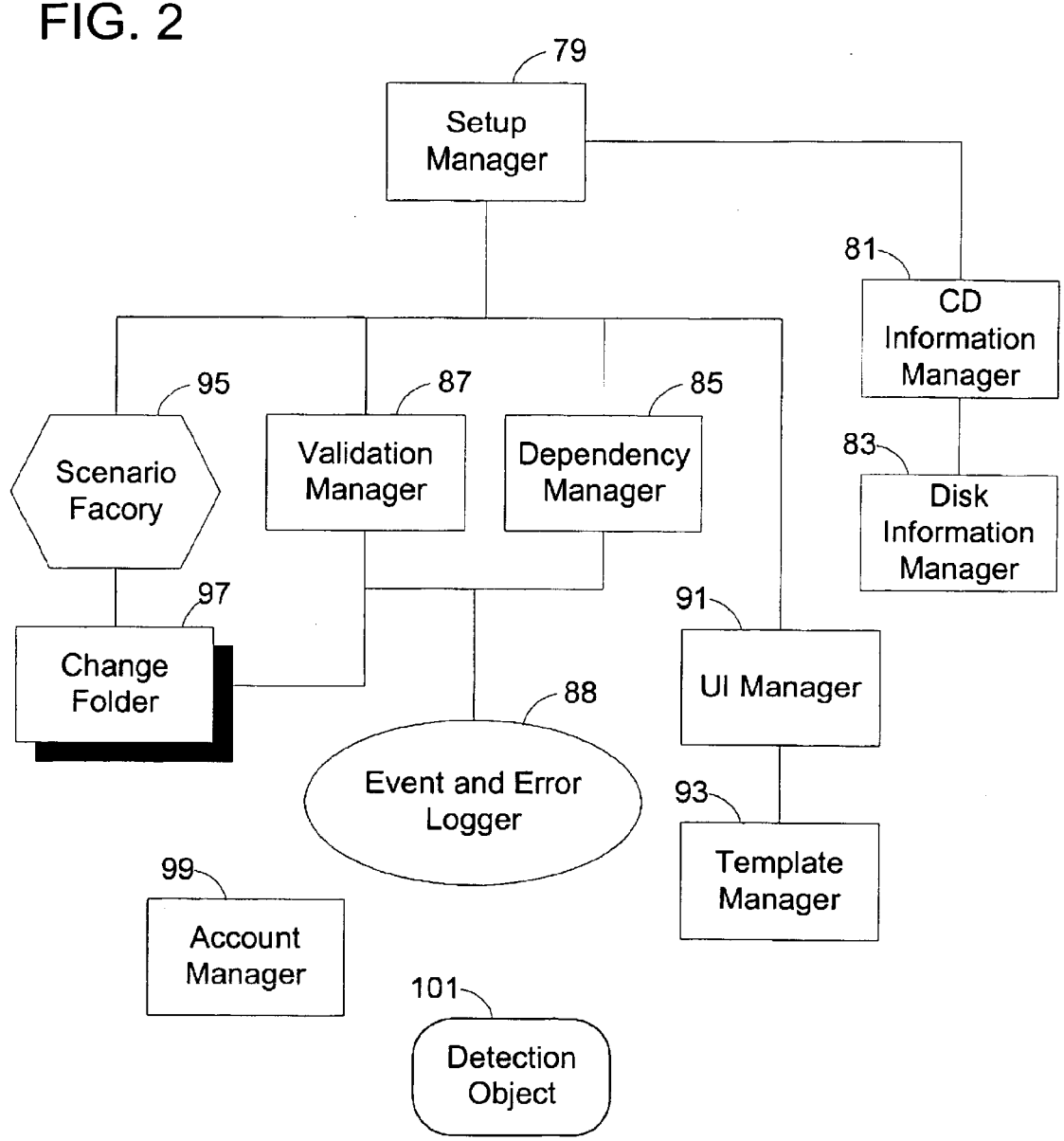
FIG. 2 is a simplified architectural block diagram of an embodiment of the Suite Integration Toolkit of the instant invention.

To gain a better appreciation of the SIT of the instant invention, attention is now directed to the simplified architectural block diagram of FIG. 2. While this FIG. 2 illustrates the SIT as functional blocks or objects, there is no intention to limit the scope of the invention to such blocks or objects, or to any particular technology or programming methodology. Instead, this simplified diagram is presented by way of illustration to aid in the understanding of the logical functionality of an aspect of the instant invention, and is not presented by way of limitation.

The SIT includes a Setup Manager 79 that drives the installation process through the setup.sdb files for the suite. CD 81 and Disk 83 Information Managers provide required information concerning file location, size, etc. for the suite CD(s) during the integration process, and for the user's system onto which the suite will be installed. During the installation process, the Setup Manager 79 utilizes the services of a Dependency Manager 85 to ensure that the required dependencies of the application programs within a suite are met. This ensures that the installation may proceed through each phase without error, and so that the application programs may run on the user's system once installed. A Validation Manager 87 is also used by the Setup Manager 79 to verify that required system components needed by the suite are met by the user's system for much the same reasons as for the Dependency Manager 85. If an error is determined during either of these checks, it is logged by an Event and Error Logger 88.

During the installation process, the Setup Manager 79 also employs the services of an UI Manager 91 to display the proper information to the user. This UI Manager 91 may utilize a Template Manager 93 if it wants to display standardized pages provided with the SIT. The UI Manager 91 may also display any customized pages identified in the setup.sdb file during the installation and setup of the suite. The construction, ordering, and insertion of these customized pages will be discussed more fully below.

During this installation and setup, the SIT may utilize a Scenario Factory 95 to install only selected application programs or components from the suite as selected by a user or as pre-configured by the suite owner. The Change Folder 97 object is used to select the destination directories for applications. SIT may also employ an Account Manager 99 if required during the installation and setup process. The SIT also includes a Detection Object 101.

While not specifically illustrated in FIG. 2, SIT may include an intermediate layer (dll) that will enable integration of an application program which relies on a different installation and setup technology (e.g.,Install Shield) into the suite. This intermediate layer will wrap the application's installation technology and interface with SIT. During installation and setup, SIT will command the component or application to install, and the dll will launch the application's installation technology.

The installation and setup process of the instant invention is seamless from a user's perspective. The SIT determines all of the information requirements for each of the application programs to be installed. SIT then takes the superset of this information and builds the information queries for display to the user to collect the required information. This information is then distributed to each application that requires it, i.e. all applications have access to the collected information. In this way, a given piece of information is collected from a user only one time. If, however, a particular application does not accept that information or otherwise requires different or contrary data for the same piece of information, SIT generates an additional information screen, the information from which will be delivered only to the application that required the different data.

The installation process is actually divided into two primary stages: baseline and install. Baseline may include both a "suite" baseline and a "scenario" baseline, or the scenario baseline can be rolled into the suite baseline if desired. The install stage of the instant invention is divided into pre-install, install, and post-install actions on a component level. The Setup Manager 79 and UI Manager 91, two of the top-level objects of SIT, handle integration of the component installations and the UI. The Dependency Manager 85 provides dependency checking and install order calculation and verification across all selected components as mentioned above. Suite owners who want to make use of a pre-difined set SIT UI templates can use the Template Manager 93 to load a Wizard page, passing in the required information for that template. Alternately, suite owners who require custom UI can write their own dialogs that are hosted in a wizard frame (header w/title, description and small graphic and footer with navigation buttons) as will be described in greater detail below with regard to FIG. 6. In both cases, components and/or scenarios handle validation and error reporting for any user input.

Figure 5:
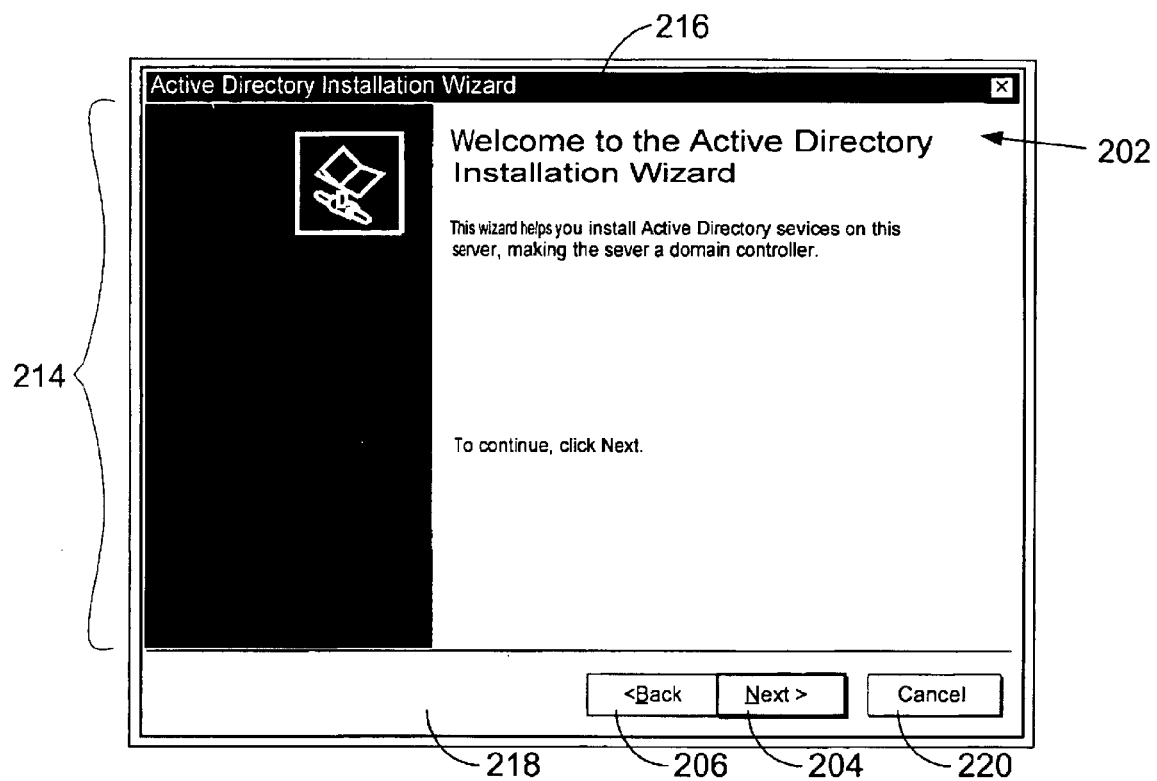
FIG. 5 is an exemplary welcome screen UI constructed in accordance with the teachings of the instant invention.

A baseline is a requirement determined by the suite owner. It concerns what OS/applications must be on a user's machine before installation of the suite can begin. Suite baseline denotes the actions necessary to get the machine to the required state for the installation of an application or suite. This may include installation of a required OS, any service packs (SPs), hot fixes, or additional applications necessary for the component or suite to install. Baseline install actions may or may not be visible to the user (i.e. install hot fixes as hidden components). By default, the UI Manager 91 displays start up screens to the user during this stage, including Welcome, Name/Organization, Password, product identification (PID), and end user license agreement (EULA). An exemplary welcome screen 200 is illustrated in FIG. 5. All startup screens can be shown/hidden as desired via a (Startup Sequence) section of the setup data file (setup.sdb).

Each component must provide information on whether it or any of it's sub components are suite baseline components. If the suite baseline is not met for a component, any requirements beyond the suite baseline are considered part of the scenario baseline and are displayed to the user on the Scenario Baseline page. If the user chooses not to install the scenario baseline components, Setup Manager 79 prevents the installation of the affected component/sub components. If the setup is unattended (hence the user does not know if the suite baseline has not been met), baseline components are installed silently. If this is not possible (i.e. due to baseline component install restrictions or baseline component is not available), then a message is written out to the error log indicating why the install cannot proceed. If the setup is attended and the Welcome page has been turned off in the setup data file, the Welcome page will still appear if the suite baseline has not been met. If the suite is checking for but not installing baseline components, and the check indicates that the suite baseline has not been met, the user will not be allowed to click on Next in the Welcome screen.

Suite baseline components may have dependent components. If these dependent components have not been marked as suite baseline components, SIT sets them as baseline components and tries to install them. If SIT cannot install the dependent components (and hence the suite baseline component), SIT informs the user, logs the error, terminates installation of the component which has a missing dependency, and continues with the rest of the installation. This is similar to the "debug and release"methodology. In this way, the entire suite installation is not adversely affected by one failed component.

As an example of this dependency requirement and the resultant accommodations that SIT makes, consider a suite with Program A, Program B, and Program C included therein. Now assume that Program B is dependent on Program C, i.e. Program B needs Program C for proper operation. SIT will detect this dependency and will install Program C before Program B, even if this requires that the install order in setup.sdb be changed. If, for some reason, Program C cannot be successfully installed, or if Program C is simply not included on the suite CD, SIT will inform the user that a required dependency is missing, skip the installation of Program B, and continue with any other installations remaining for the suite.

As discussed above, a similar problem exists with regard to different versions of the same component required by different application programs. To illustrate, assume Program B requires Component version 1.0, and Program C requires Component version 2.5. Installation of Program C will result in Component version 2.5 being installed on the user's system first (since the dependency requirement between applications must be met as described above). The later installation of Program B would in the past result in the installation of Component 1.0, overwriting Component 2.5. After Program B was installed, prior installation technologies would need to go back and install Component 2.5 for a second time to overwrite the older version that overwrote it. This problem has been overcome with the instant invention. Specifically, SIT utilizes a concept called "shared components" to recognize this situation and install only the latest version of the Component needed by various applications. This greatly reduces the overhead of the installation process as each Component is installed only once.

SIT also supports a scenario baseline. In instances where a user selects a scenario from a Scenario Selection page that has a higher baseline than the entire suite (e.g. when a third-party adds a scenario and does not update the suite baseline), SIT first checks the scenario baseline for the selected scenario. Next, SIT informs the user if scenario baseline has not been met. By default, SIT provides the Scenario Baseline page that displays what components need to be on the user's machine and what components are currently installed, similar to the Welcome page used for communicating suite baseline requirements. The user can click Next to install the scenario baseline components and continue with the installation, click Cancel to exit setup, or click Back to select a different scenario. Finally, SIT installs the scenario baseline components if they are available.

Figure 3:
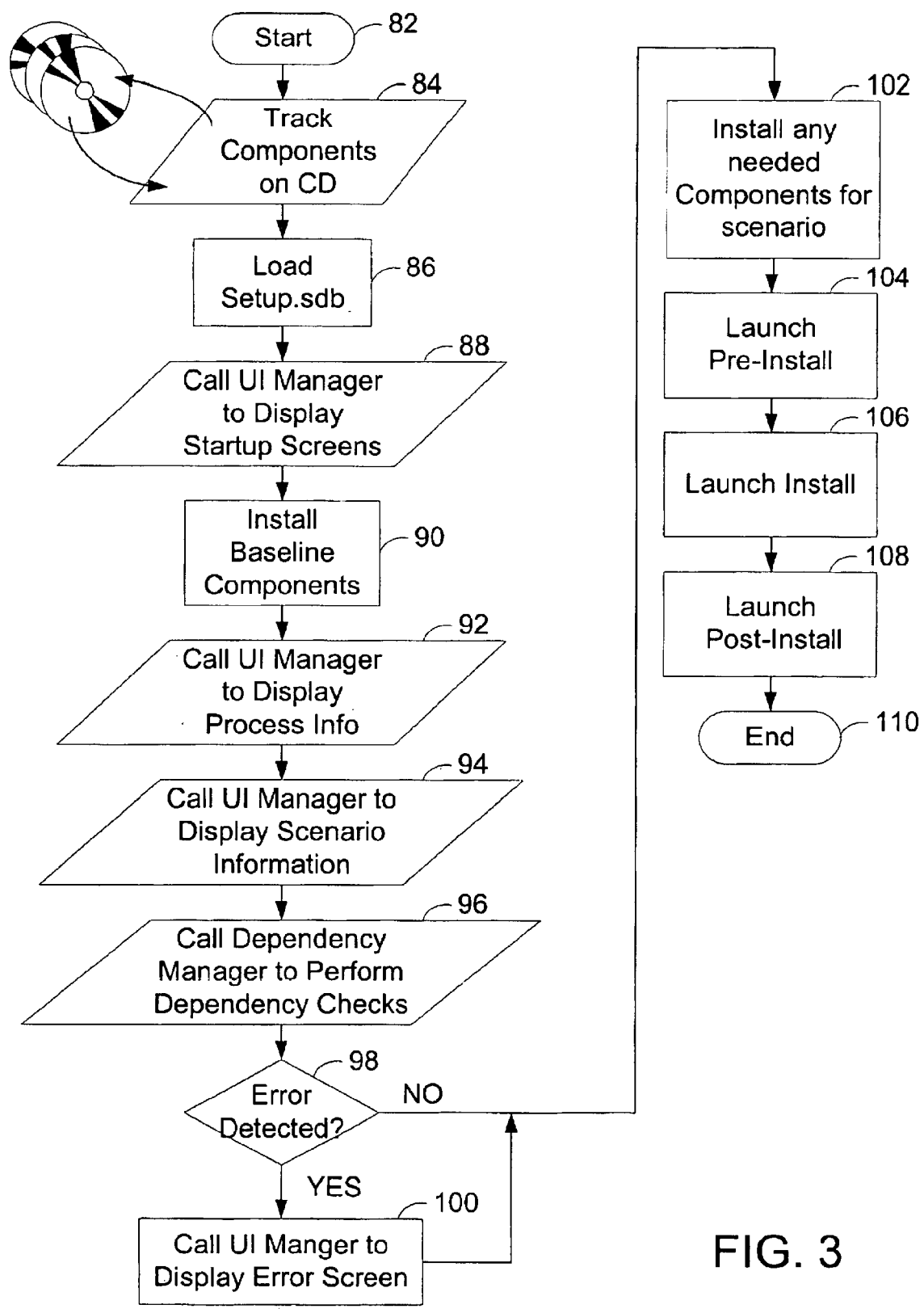
FIG. 3 is a simplified process flow diagram illustrating the setup management in accordance with a method of the instant invention.

With this basic understanding of installation process now in hand, attention is now directed to FIG. 3 for a more detailed explanation of the integration and installation process driven by the Setup Manager 79 of SIT. Once the Setup Manager has been initiated 82, it then acquires from the setup.sdb file information concerning where the component bits are located on the suite CDs (the CD layout) 84. It then loads 86 the setup data file (setup.sdb) that contains general installation information, including scenarios, display order of components, list of startup and finish screens, etc. The UI Manager 91 of SIT is then called 88 to display the suite installation startup screens from which the UI Manager 91 gathers and validates user input. The construction, customization, ordering, etc. will be described in greater detail below. The Setup Manager then installs 90 required baseline components, and calls 92 the UI Manager 91 to display progress information during baseline install (preferably, progress will be displayed during silent baseline as well). The UI Manager 91 is then called 94 to retrieve and display scenario information from components and/or from the (Scenarios) section in data file as discussed above.

Then, the Dependency Manager is called 96 to perform dependency checking among the components that user has selected. This dependency checking will be described more fully below. If any conflicts are detected 98, the UI Manager 91 is called 100 to display a Dependency UI screen. The dependency UI will display what the perceived conflicts are and will allow the user to cancel the request which caused the problem, or to have SIT automatically set the Actions of the required components to a state which resolves the issue. Scenario data files provide a simple hook into setup for third-party users of the Setup Manager. The Setup Manager also installs 102, when necessary, components needed to achieve the scenario baseline if it differs from the suite baseline. This may occur, e.g., when a third party modifies a scenario data file, but neglects to modify the setup data file. As a result, the scenario baseline is no longer a subset of the suite baseline and requires the installation of additional components. The Setup Manager also launches pre-install 104, install 106, and post-install 108 loops and sends messages to components/sub components to perform actions during these installation stages before the process terminates 110.

Third-party calls into this setup process are also supported in the system of the instant invention. If desired, these third parties can hook in as the setup data file is loaded. As an example, the data file shipped with a suite can be modified and shipped on a third party supplied CD that is loaded first in the installation process. In this case, the Setup Manager will load the updated data file containing third-party product information as part of the startup. Alternatively, third parties can hook in after the suite baseline has been achieved by replacing/rewriting the scenario data file.

Figure 4A:
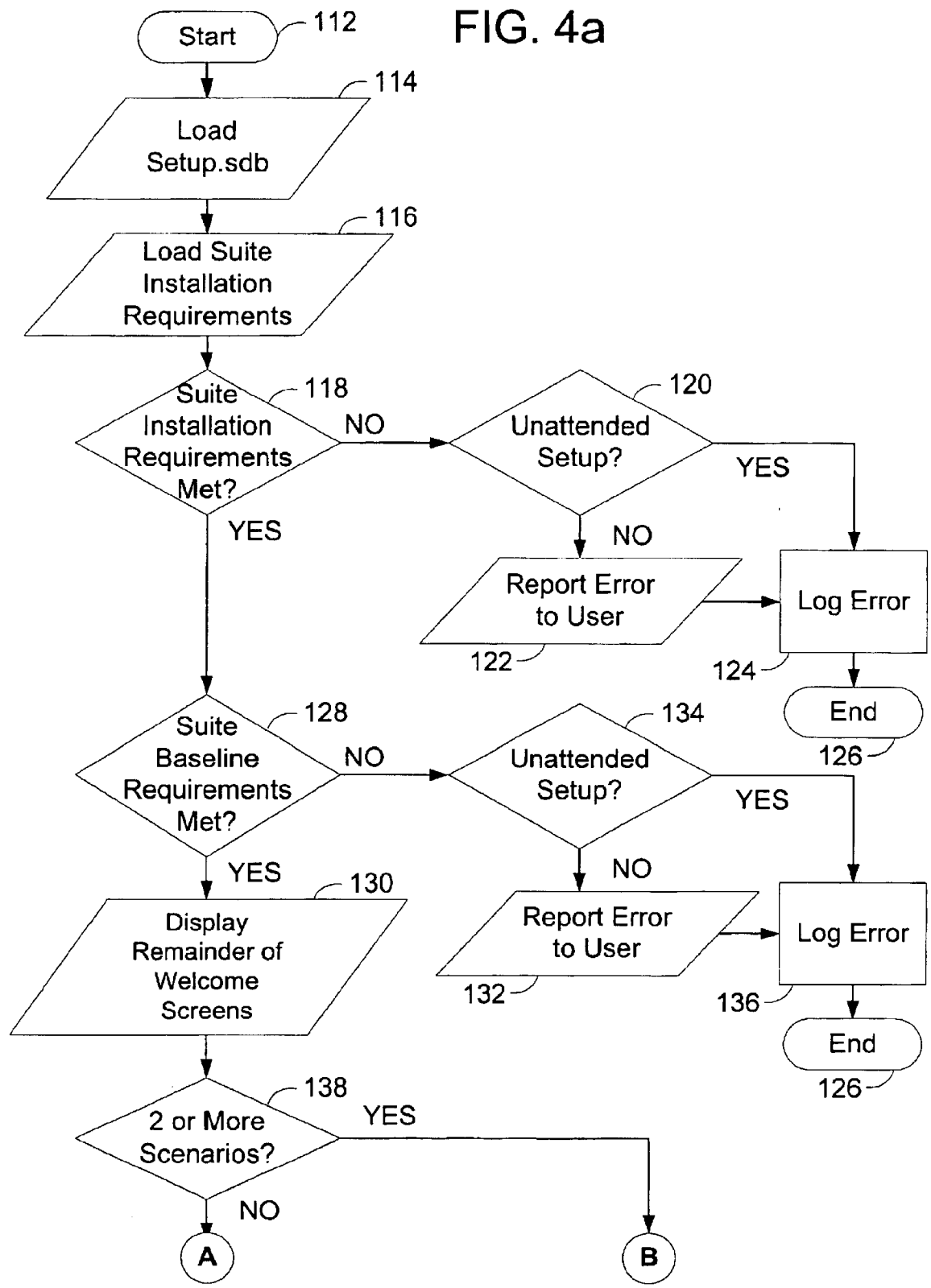
FIGS. 4a–c are simplified process flow diagrams illustrating the basic flow of a suite setup in accordance with a method of the instant invention.
Figure 4B:
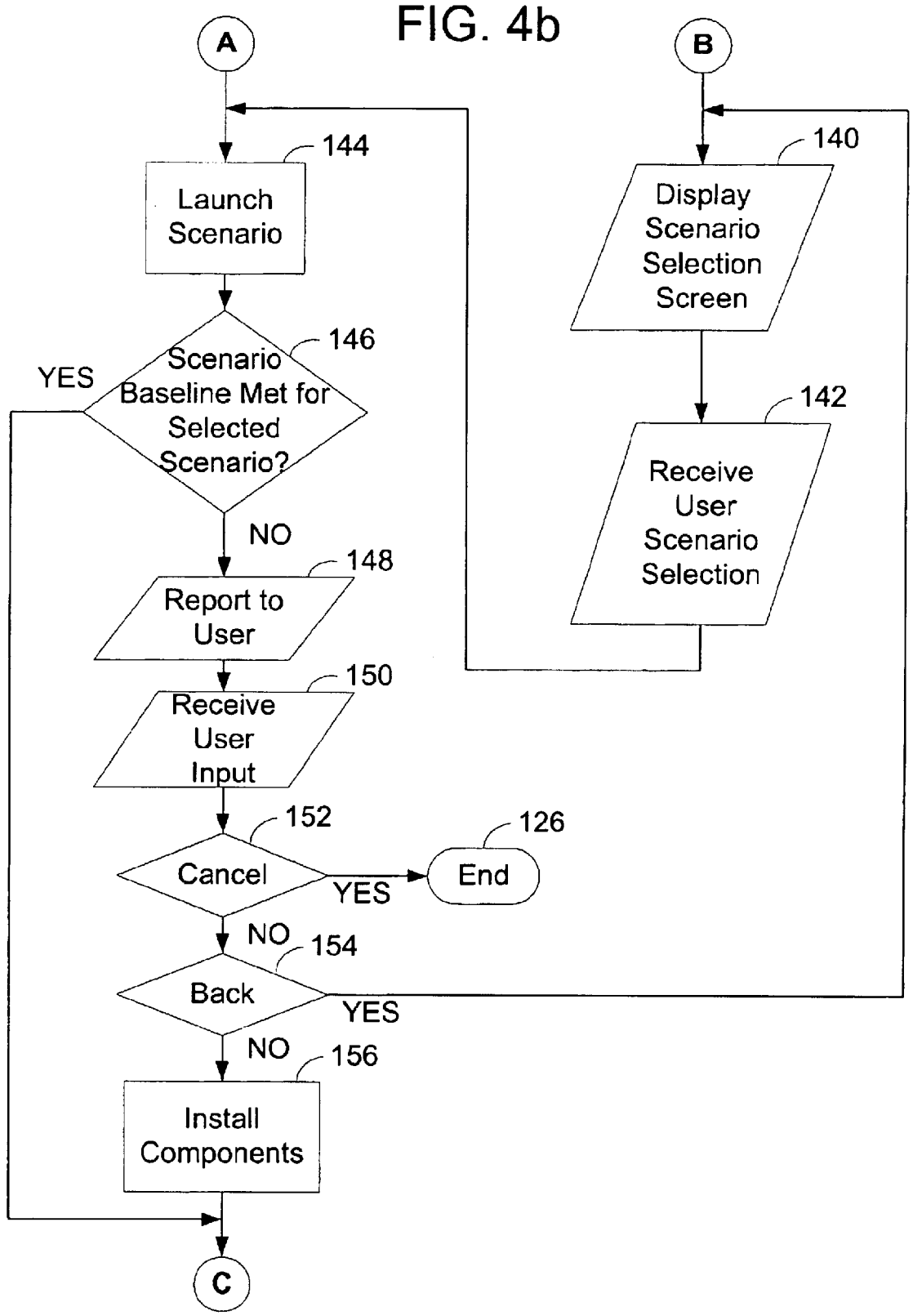
Figure 4C:
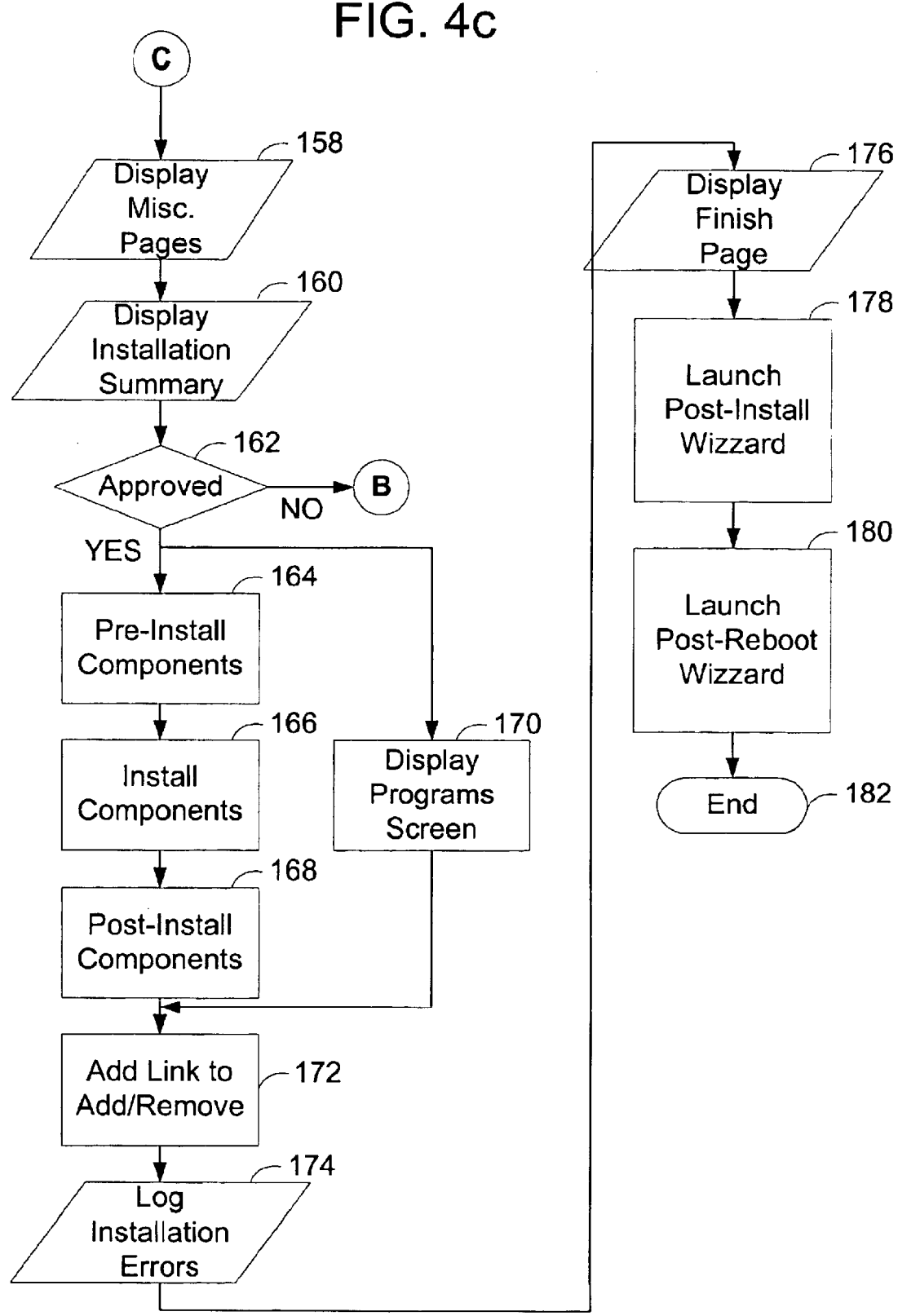

Turning now to FIGS. 4*a–c*, the basic flow of a suite setup is illustrated in greater detail. Once started 112, the setup.sdb file is loaded 114 as discussed above. If the setup data file is missing or cannot be loaded, a message box appears and informs the user of the problem. The suite installation requirements dynamic load libraries (dll) are then loaded 116 if specified, and a check is made 118 to determine if suite requirements have been met (i.e. RAM, processor, platform, pagefile, etc.). Insufficient suite requirements are reported to the user 122 via the Welcome screen, or an error is logged 124 and setup terminates 126 in the unattended case 120.

A check that the system meets the minimum requirements for the suite baseline is then performed 128. If the minimum requirements are not met, this is reported to the user 132. If the setup is unattended 134, the error is logged 136 and setup is terminated 126. Setting the custom property of all required suite baseline components can specify the suite baseline. This method is used when SIT is installing baseline components. The suite baseline can also be specified in the setup data file as indicated above. In such a case, SIT handles detection of the baseline, but the installation of baseline components is done outside of SIT.

Generally, suite baselines include OS, SPs, quick fix engineering or hot fixes (QFEs) (possibly as hidden components), Internet Explorer (IE), etc. The default Welcome page displays information about the users machine and suite baseline components required, if any. Then the remainders of default startup screens are displayed 130. Preferably, all screens are optional, and may include Name/Organization, Password, product identification (PID), end user license agreement (EULA), AutoLogon, etc. Screens can be shown/hidden by adding/deleting the names of the screens in the (Startup Screens) section of the setup data file. A suite owner or third party can add their own UI at anytime in this sequence, or launch applications and/or processes during this sequence as will be discussed further below.

Next, if there are two or more scenarios 138, the scenario selection screen is displayed 140. This occurs once the suite baseline options have been satisfied and the startup screens (if specified), have been displayed. The screen displayed is the initial UI page specified in the scenario data file. On this page, users can choose 142 from a number of different pre-configured setups, or select Custom Scenario to completely customize the component or suite installation. If there is only one valid scenario available, that scenario is launched 144 without first displaying the Scenario Selection page. The scenario baseline based on the selected scenario is then checked 146. The user is informed 148 if the scenario baseline has not been met. By default, SIT provides the Scenario Baseline page that displays what components need to be on the user's machine and what components are currently installed, similar to the Welcome page used for communicating suite baseline requirements. The user can 150 click Next to install 156 the scenario baseline components and continue w/installation, click Cancel 152 to exit setup 126, or click Back 154 to select a different scenario.

The selected scenario may display a component selection page if users are given the option of selecting/deselecting components and sub components. The component selection page presents the user with a tree view containing all of the components and their sub components. From this view the user may select or deselect a component and set its installation directory of any component. Users can also specify the setup action to be performed on each component or sub component (e.g. install, uninstall, add, recovery, no action). Version information and disk space requirements may also be displayed on this page. As users select and deselect the components or modify install actions on a component, full dependency checking is performed.

At this point in the setup, any components with additional UI requirements may present their UI pages 158. The default is to have custom UI pages for components appear in the order in which the components are listed in Component Selection page, although this may be changed as desired. Next, an installation summary is provided 160. All of the options and information the user has selected is displayed for final approval 162. Preferably, the user can navigate back to modify any of his or her selections from this screen.

Once the setup has been approved 162, the Setup Manager sends 164 pre-install message to all components and all sub components as discussed above. The components have the option of prompting the user if they want to perform the pre-install action for a component. The suite owner can also specify pre-install actions by default and suppress user prompt. The Setup Manager then sends 166 an install message to all selected components and sub components. Next, the Setup Manager sends 168 post-install message to all components and sub components. As with the pre-install, the components have the option of prompting user if they want to perform the post-install action for a component. The suite owner can also specify post-install actions by default and suppress user prompt.

During this process, an installation-progress page is provided 170. As SIT loops through pre-install components, install components, and post-install components as specified in the (Pre Install Order), (Install Order), and (Post Install Order) sections of the setup data file, the description text in the header of the progress screen updates with each change in install stage. This provides an indication of where in the process SIT is. SIT also adds a link 172 in the Add/Remove section of Control Panel. The name of the link corresponds to the suite name as specified in the (Product Information) section of the setup data file., Further, any installation errors encountered during the course of installation are logged 174 to a file specified in the (Error Log) section of the setup data file. A finish page is then displayed 176, and SIT writes out an unattended file for the completed setup.

Each component can launch 178 post-installation wizards or scripts. The suite can also specify a suite-wide wizard or script to be run, which can also be driven via the scenario. Each component may also specify an executable to run post-reboot 180. This can also be driven via the scenario. After these actions have been taken, as desired, the process is complete 182.

With an understanding of the SIT of the instant invention well in hand from the foregoing description, attention is now focused on the UI Manager 91 (see FIG. 2) and the system of providing, modifying, extending, replacing, and rendering portable the UI for an installation and setup system for a suite of applications in accordance with a specific aspect of the instant invention. The UI Manager 91 performs various functions in accordance with the instant invention. It reads the setup and scenario data files (if present) for the UI to be displayed, and queries components for any additional/custom UI to be displayed. The UI Manager 91 also displays all shared and custom UI pages, and validates all user input for startup screens. This includes account names, permissions, passwords, EULA agreement, machine names, domain names, and numbers. Components are required to provide validation for all user input on custom UI screens.

Default pages supplied in a preferred embodiment of the invention include startup screens (displayed during the baseline stage), common/shared screens (displayed during the install stage), and finish screens (displayed during the post-install stage). Default startup screens preferably include the following screens: Welcome; Suite Baseline; EULA; Name/Organization; PID; Name/Org/PID (combined layout); and Autologon. Default Common/Shared screens included the following: Scenario Selection; Scenario Baseline; Component Selection; Data Directory Selection; Account Selection; UI Templates; Installation Summary; Installation Progress (standard and small). The default finish pages provided in a preferred embodiment includes an installation errors screen and a finish page.

Any setup using the UI Manager 91 can specify display order and show/hide for all of the startup pages, shared configuration pages and any custom UI pages. The only exception to this rule is the finish page, which will always be displayed. Otherwise, displaying UI is optional. All default pages support Hide/Show except the finish page. Display of a startup page and the order in which it is displayed is specified in the (Startup Sequence) section of the setup data file (setup.sdb). An example of the (Startup Sequence) section of the setup.sdb file displaying the Welcome, Name/Org, Password, PID, and EULA screens is as follows:

(Start up Sequence)
Welcome
NameOrg
Autologon
PID
EULA

Display of a finish page and the order in which it is displayed is specified in the (Finish Sequence) section of the setup data file. In an exemplary embodiment, the (Finish Sequence) section displays the Installation Error and the Finish screens. The order of these screens cannot be modified in a preferred embodiment. An example structure is as follows:

(Finish Sequence)
Installation Error
Finish

In the SIT of the instant invention, various startup pages (Wizard style) are preferably provided as a default for those suites/applications that want to use them during the suite baseline stage of installation. Advantageously, any or all of these pages can be suppressed by not including them in the (Startup Sequence) section of the setup data file. This may be accomplished by simply editing the text of this file using a standard text editor. The UI Manager 91 handles validation for all of the user input on these pages. One such default screen introduced above is the Welcome screen 200 illustrated in FIG. 5. It contains introductory welcome text 202 and information on required baseline component requirements that the current machine does not meet, if any. WelcomeHeaderText and WelcomeFooterText variables from the (Product Information) section of the setup.sdb file can be used to modify the contents of this screen. A License Agreement screen is also included. It displays the EULA specified in the (License File) section of the setup data file.

Both a Name/Organization and an Autologon screen are also preferably provided. This screen prompts and validates name and organization information. If either the name or organization is required for setup, then the RequireName and/or RequireOrg flags can be set in the (Product Information) section of the setup data file. PID screens introduced above are also provided in this embodiment. These screens provide default UI for the PID pages. For suites shipping components with multiple PID components, the suite must decide which PID the suite requires, whether to use hard-coded PIDs for the non-suite pieces, and what type of tracking is required and hence which PID version to use for the suite. The UI Manager 91 performs the validation. Navigation (standard template) and validation may be the same for different PID type pages. By default, the Next button is disabled until the user enters the required number of characters for a valid PID. The UI Manager 91 validates the characters entered; if valid, the Next button is enabled; if invalid, an error message appears indicating that an invalid PID was entered.

A Combined Name/Organization/PID screen is also preferably provided as a default. If the suite owner desires to reduce the number of screens displayed to the end-user, then this screen can be used to combine entry and validation for name, organization, PID. Finally, a preferred embodiment also includes an Autologon/Password screen. This screen allows the user to select whether setup will automatically log the user back on in the event a reboot is required. If autologon is selected then the user must supply a valid password. Otherwise, the user will need to manually log back on whenever a reboot is performed. The UI Manager 91 performs this password validation.

As indicated above, the suite owner lists all startup pages to be displayed in the (Startup Sequence) section of the setup data file. If this section is empty, then no UI is displayed during this install stage. By default, the Welcome screen 200 is displayed first; no other page can appear before it. All other startup screens can appear in any order that the suite owner specifies in the setup.sdb file.

The common/shared pages introduced above include the Scenario Selection screen. This screen displays a list of available scenarios returned via the Scenario Factory specified in the (Scenario Factory) section of the setup data file. If there is an error with one or more of the returned scenarios, an entry is written to the error log and only the remaining error-free scenarios are displayed. The Scenario Baseline screen is similar to the Welcome screen in that it indicates that the baseline for the selected scenario has not been met, and lists the components that must be installed in order to continue. If user selects continue, additional components are installed to meet the scenario baseline and the installation proceeds. Otherwise, the user must cancel the installation.

The Component Selection screen displays all components and sub components, and the available actions for each (e.g. Install, Reinstall,. Add, Remove, etc.). The available actions for each component are determined by querying the component (and its sub components). The display order for the components is specified in the (Component Order) section of the setup data file. UI relationships between the listed components are indicated by a number preceding the name of the component. For example, a number 1 indicates a top-level component, all subsequent components beneath it are preceded with numbers greater than 1. These numbers indicate sub-components. The next instance of a 1 in the list indicates another top-level component. A single component can appear as a sub component of more than one component, although it will preferably be installed only once. When a user deselects a component that appears more than once on the Component Selection page, it is deselected everywhere in the Component Selection page. An example of one components with $2^{nd}$ and $3^{rd}$ level sub components appears in the (Component Order) listing below. In this exemplary listing, the top-level component is "Internet Explorer 5 and Internet Tools." The $2^{nd}$ level components are "Internet Explorer 5" and "Communication Components." All other components are $3^{rd}$ level components (sub components of the $2^{nd}$ level components).

(Component Order)
1,Internet Explorer 5 and Internet Tools
2,Internet Explorer 5
3,Internet Explorer 5 Web Browser
3,Offline Browsing Pack
3,Internet Explorer Help
3,Microsoft virtual machine
3,Internet Connection Wizard
3,Internet Explorer Core Fonts
3,Dynamic HTML Data Binding
3,Internet Explorer Browsing Enhancements
2,Communication Components
3,NetMeeting
3,Outlook Express
3,Chat 2.5

A Dependency Violation Screen is only displayed if a user selects an action for a component that violates one or more pre-defined dependency relationships. For example, if component A depends on component B and both have a default action of Install, if the user chooses to not install B but leaves A as Install, the dependency manager will detect the conflict and display the details of the violation to the user using this screen. The user can then opt to cancel the offending action change, or to have SIT set the Actions of the relevant components to a state that resolves the problem and returns the user to the component selection screen with the required changes enabled.

A Data Directory Selection screen displays data directories that can be modified for selected components and sub components. Information entered here is passed back to the owner component for validation. Components then perform their own required checks (e.g. requiring new technology file system (NTFS), no double byte character sets (DBCS), etc.) and report errors if problems encountered. An Assign Accounts screen displays a list of required and optional accounts for selected components and sub components. Information entered here is passed back to the owner component for validation. Components then perform their own required checks (e.g. requiring new technology file system (NTFS), no double byte character sets (DBCS), etc.) and report errors if problems encountered as well.

An Installation Summary (Confirmation) screen displays selected components and sub components and the action to be performed for each. Only components with an action other than "No Action" will appear on this page. Finally, an Installation Progress screen displays installation progress for selected components/sub components. Two default templates provided in a preferred embodiment, one with a component progress bar and overall installation progress bar (standard Wizard size), and another with a component progress bar only (small).

In a preferred embodiment of the instant invention, the following finish pages (Wizard style) are provided as a default for those suites/applications that want to use them after the install stage of installation has completed. Any or all of these pages can be suppressed. The finish page, when specified, must be the last page in the sequence. An Installation Errors screen displays a list of components/sub components installed, whether the installation was successful, and, if not successful, why. The Finish screen displays text indicating that the installation is complete. This screen may indicate whether any post-reboot/post-installation steps are needed to be taken, and may contain pointers to program groups, documentation, etc.

As the above description makes clear, an aspect of the instant invention is the ability to completely rewrite the custom UI model. Since SIT uses COM interfaces for all of it's operations, the UI Manager 91 is included in the list of managers supported by SIT. The interface (ISetupUI) is designed to support different phases of setup In a preferred embodiment, the installation phases include Startup, Scenario Selection, Scenario Sequence, and Finish. This split between phases of setup allow any model of UI to be represented within the scope of SIT. For example, a wizard could be divided as follows (each indented item below is a different page in the wizard):
   STARTUP
     Welcome screen
     EULA
     Name, organization and PID
   SCENARIO SELECTION
     Location of suite files
     A list of the scenarios
   SCENARIO SEQUENCE.

Component selection
Data directories and accounts
Component specific pages
Summary
Progress
FINISH
Finish page If a product wanted to use a web-based interface, it could be broken up into, preferably, three specific web pages as follows:

STARTUP
Welcome text, EULA, name, organization and PID
SCENARIO SELECTION / SCENARIO SEQUENCE
Selection of type of install and components to install
FINISH
Progress and finish information Another aspect of the instant invention is the ability to extend the existing/sample UI model to meet specific needs of the suite owner. The sample UI that is provided with a preferred embodiment of the SIT of the instant invention is in the wizard format, and is driven by several sections in the setup.sdb file. Wizards are a type of property sheet that provides a simple and powerful way to guide users through complex procedures, and are one of the keys to simplifying the user experience. They allow a suite owner to take a complex operation, such as installation and configuration of a suite of applications, and break it into a series of simple steps. At each point in the process, the installation wizard can provide an explanation of what is needed, and display controls that allow the user to make selections and enter text. In terms of implementation, a wizard is actually a type of property sheet. A property sheet is essentially a container for a collection of pages, where each page is a separate dialog box. A standard property sheet displays the pages as if they were stacked one on top of the other. Each page has a tab at the top, and users select a page by clicking its tab. They then interact with the page as they would with a regular dialog box.

Figure 6:
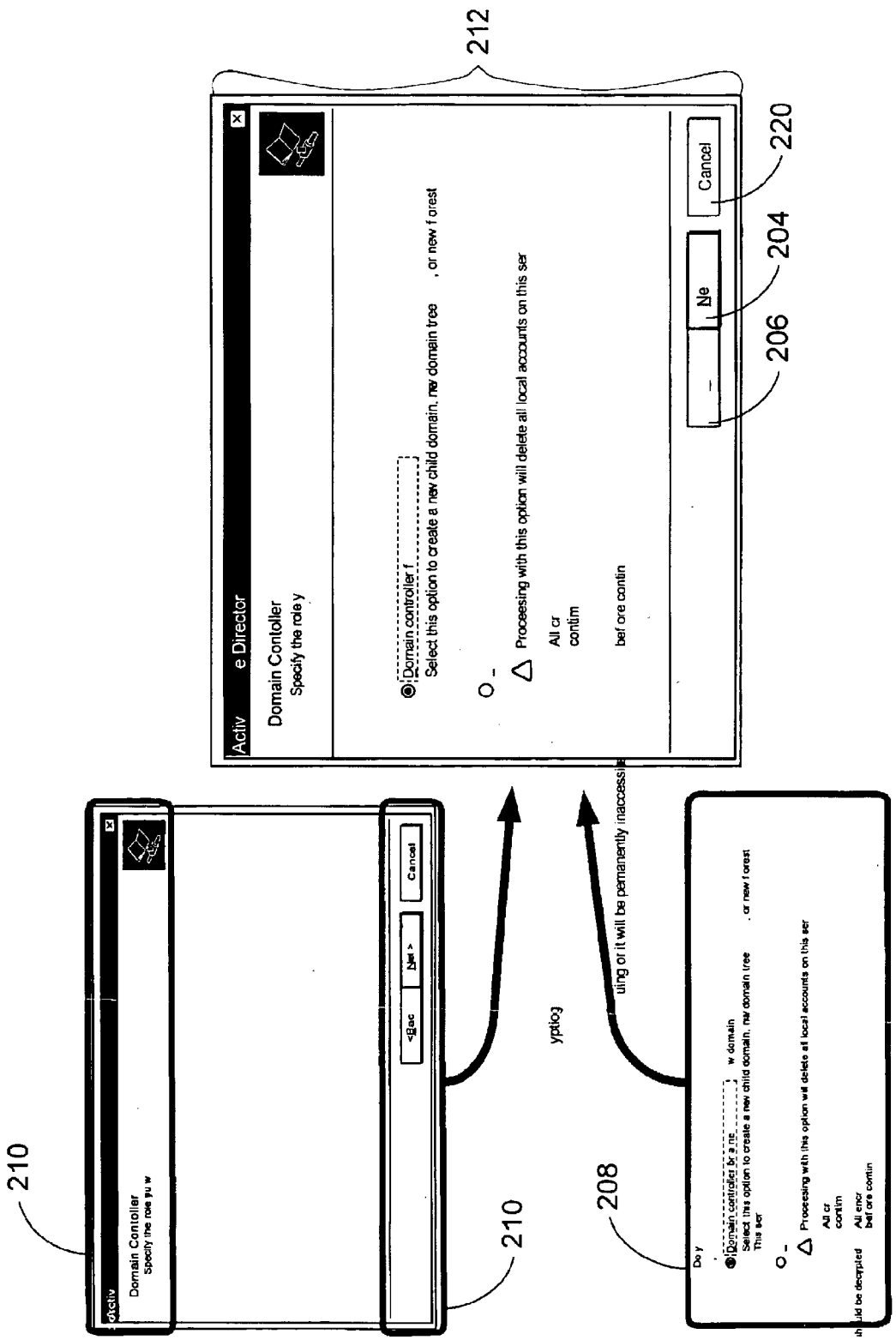
FIG. 6 is a screen construction diagram illustrating exemplary constituent component of a wizard screen constructed in accordance with the teachings of the instant invention.

Wizards present pages one at a time. Instead of tabs, there are Next 204 and Back 206 buttons located at the bottom of the wizard as illustrated in FIG. 6. Users click these buttons 204, 206 to navigate forward or backward through a sequence of pages. Implementing a wizard is similar to implementing a regular property sheet. At the most basic level, it is simply a matter of setting the appropriate style flag. To implement the individual pages, the same dialog box programming techniques used for property sheets are used.

To implement a wizard for the setup UI in accordance with the instant invention, the suit owner creates a dialog box template for each page. The actual pages are defined by creating a PROPSHEETPAGE structure 208 for each page as will be discussed in greater detail below. This structure 208 defines the page, and contains pointers to the dialog box template and any bitmaps or other resources. The PROPSHEETPAGE structure created in the previous step is then passed to CreatePropertySheetPage to create the page's HPROPSHEETPAGE handle. The wizard is then defined by creating a PROPSHEETHEADER structure 210 for it, which is then passed to the PropertySheet to display the wizard 212.

There are two basic types of wizard page: exterior and interior. The exterior pages are the Welcome 200 and Finish pages. The other pages in the wizard are interior pages, such as page 212. The exterior pages come at the beginning and end of the installation and setup sequence of the instant invention, respectively, and their basic layout is nearly identical.

As FIG. 5 illustrates, the dialog box 214 fills all of the Window 200, except for the caption 216 and the band 218 at the bottom that contains the Back 206, Next 204, and Cancel 220 buttons. The main difference between the two types of exterior page is the wizard buttons and the text in the static controls. The Welcome page 200 preferably has a Next 204 and a Back 206 button, with only the Next button 204 enabled. The Finish page has the Back button enabled, and the Next button is replaced by a Finish button.

Interior pages have a somewhat different appearance than exterior pages as illustrated by the exemplary page 212 of FIG. 6. The header area 210 at the top of the page 212 is handled by the property sheet, so it is not included in the template 208. The contents of the header 210 are specified in the page's PROPSHEETPAGE structure and the wizard's PROPSHEETHEADER structure. The Win32 structure PROPSHEETHEADER contains information about the window owner of the wizard, the location of the module that owns the wizard, the caption to be shown at the top of the wizard, a list of pages to be shown in the wizard, and the bitmaps to show on the welcome and mainline pages. The structure is defined in Win32 as:

```
typedef struct _PROPSHEETHEADER {
    DWORD dwSize;
    DWORD dwFlags;
    HWND hwndparent;
    HINSTANCE hInstance;
    union
    {
        HICON hIcon;
        LPCTSTR pszIcon;
    };
    LPCTSTR pszCaption;
    UINT nPages;
    union
    {
        UINT nStartPage;
        LPCTSTR pStartPage;
    };
    union
    {
        LPCPROPSHEETPAGE ppsp;
        HPROPSHEETPAGE FAR*phpage;
    };
    PFNPROPSHEETCALLBACK pfncallback;
#if (_WIN32IE>=0x0500)
    union
    {
        HBITMAP hbmWatermark;
        LPCTSTR pszbmWatermark;
    };
    HPALETTE hplWatermark;
    union
    {
        HBITMAP hbmHeader;
        LPCSTR pszbmHeader;
    };
#endif
} PROPSHEETHEADER, FAR*LPPROPSHEETHEADER;
```

Because the interior pages' template 208 needs to fit between the header 210 and the buttons 204, 206, 220, it is somewhat smaller than the template 214 for exterior pages 200. This part of the wizard is contained in the Win32 structure PROPSHEETPAGE as indicated above. This structure contains information identifying the resources from which to pull the controls, the title to be shown at the top of the wizard (if different from the main wizard), and the header and sub-header text to be shown at the top of the page. The structure is defined in Win32 as:

```
typedef struct _PROPSHEETPAGE {
    DWORD dwSize;
    DWORD dwFlags;
    HINSTANCE hInstance;
    union
    {
        LPCSTR pszTemplate;
        LPCDLGTEMPLATE pResource;
    };
    union
    {
        HICON hIcon;
        LPCSTR pszIcon;
    };
    LPCSTR pszTitle;
    DLGPROC pfnDlgProc;
    LPARAM lParam;
    LPFNPSPCALLBACK pfnCallback;
    UINT FAR*pcRefParent;
#if (_WIN32_IE>=0x0500)
    LPCTSTR pszHeaderTitle;
    LPCTSTR pszHeaderSubTitle;
#endif
} PROPSHEETPAGE, FAR*LPPROPSHEETPAGE;
```

Aside from rearranging the order of the pages, as will be discussed in greater detail below, pages could be inserted in the order without affecting the sample UI simply by inserting the UI page into the setup.sdb file. Below is an example of a segment of a sample UI, and how it could be modified to include other pages from a suite owner who wants to extend the UI.

sample UI:
(welcome sequence)
welcome
license
nameorg
modified UI:
(welcome sequence)
welcome
license
suiteui.dll-procedure
nameorg The system of the instant invention also includes the ability to rearrange the existing/sample UI without modifying any code by simple text file modification of the setup.sdb file. In other setup applications, changing the flow of usually means changing code or a pre-compiled script. Since the SIT sample model of UI is driven entirely from a text file, modifications to the order of the sample UI can be made with a simple text editor. An example of this rearrangement in accordance with the instant invention, the below illustrates a simple text file modification of the setup.sdb file to suppress the autologon and ask for name/org before the licence(EULA):

sample UI:
(welcome sequence)
welcome
license
nameorg
autologon
UI after modification:
(welcome sequence)
welcome
nameorg
license A further aspect of the instant invention is the ability to easily reuse existing UI pages from a different SIT suite. Since the wizard format is a standard in Windows, the structure of a wizard page is well known. The implementation of the UI in accordance with a preferred embodiment allows the pages to be exported from a DLL via a specified function. This allows the UI to either be tied in with the component dll, or written in a separate DLL. Writing the UI in a separate DLL allows the UI to be contained without a tie to the component, so that if the component needs a major change the UI can stay the same.

All of the references cited herein, including patents, patent applications,.and publications, are hereby incorporated in their entireties by reference.

In view of the many possible embodiments to which principle of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of modifying a display order of user interface (UI screens, comprising the steps of:
    providing a single record text based setup data file for a suite installation and setup application having at least one section containing a display order textual listing of the user interface (UI) screens;
    providing a text editor; and
    editing the display order textual listing of the UI screens in the setup data file using the text editor.

2. The method of claim 1, wherein the display order textual listing includes a plurality of individual UI screen identifiers, and wherein said step of editing comprises the step of deleting at least one of the plurality of individual UI screen identifiers.

3. The method of claim 1, wherein the display order textual listing includes a plurality of individual UI screen identifiers listed in a first order, and wherein said step of editing comprises the step of reordering the individual UI screen identifiers to a second order.

4. The method of claim 1, wherein the display order textual listing includes a plurality of individual UI screen identifiers, and wherein said step of editing comprises the step of adding a new UI screen identifier.

5. The method of claim 1, wherein the display order textual listing includes a plurality of individual UI screen identifiers, and wherein said step of editing comprises the step of replacing the plurality of individual UI screen identifiers with a new textual listing of screen identifiers.

6. The method of claim 1, further comprising the step of providing a dynamic link library (dll) defining a UI screen, and wherein said step of editing comprises the step of inserting a textual reference to the dll in the display order textual listing.

7. The method of claim 1, further comprising the step of providing an executable (EXE) file defining a UI screen, and wherein said step of editing comprises the step of inserting a textual reference to the EXE file in the display order textual listing.

8. The method of claim 1, further comprising the steps of providing a suite installation program having UI screen templates provided therein, wherein the display order textual listing includes a plurality of individual UI screen identifiers, and wherein at least one of said individual UI screen identifiers relate to one of said UI screen templates.

9. A computer-readable medium having stored thereon computer-executable components comprising a plurality of components bundled in a suite, and a single record text based setup database file, said setup database file including a display order textual listing that is modifiable via a text editor, the display order textual listing identifying a specific user interface (UI) screens to be displayed during installation of said components.

10. The computer-readable medium of claim 9, further including at least one dynamic link library (dll) defining a UI screen, and wherein said display order textual listing contains a textual reference to said dll.

11. The computer-readable medium of claim 9, further including at least one executable (EXE) file defining a UI screen, and wherein said display order textual listing contains a textual reference to said EXE file.

12. A computer-readable medium having stored thereon computer-executable instructions to perform the steps of:

acquiring a single record textual listing whose order of user interface screens is modifiable via a text editor, the display order textual listing providing a listing of user interface screens for each of applications in a suite that are to be installed;

acquiring the user interface screens identified by the textual listing; and displaying the user interface screens identified by the textual listing for each of the applications in the suite that are to be installed.

13. The computer-readable medium of claim 12, wherein said step of acquiring the user interface screens comprises the step of acquiring user interface screen templates provided by an installation application.

14. The computer-readable medium of claim 12, wherein said step of acquiring the user interface screens comprises the step of acquiring at least one user interface screen dynamic link library (dll) defining at least one user interface screen.

15. The computer-readable medium of claim 12, wherein said step of acquiring the user interface screens comprises the step of acquiring at least one user interface screen executable file (EXE) defining at least one user interface screen.

* * * * *